Dec. 18, 1956         J. R. SQUIRE         2,774,132
METHOD OF MAKING ROLLER BEARING ROLLER RETAINERS
Filed Aug. 17, 1953         2 Sheets-Sheet 1
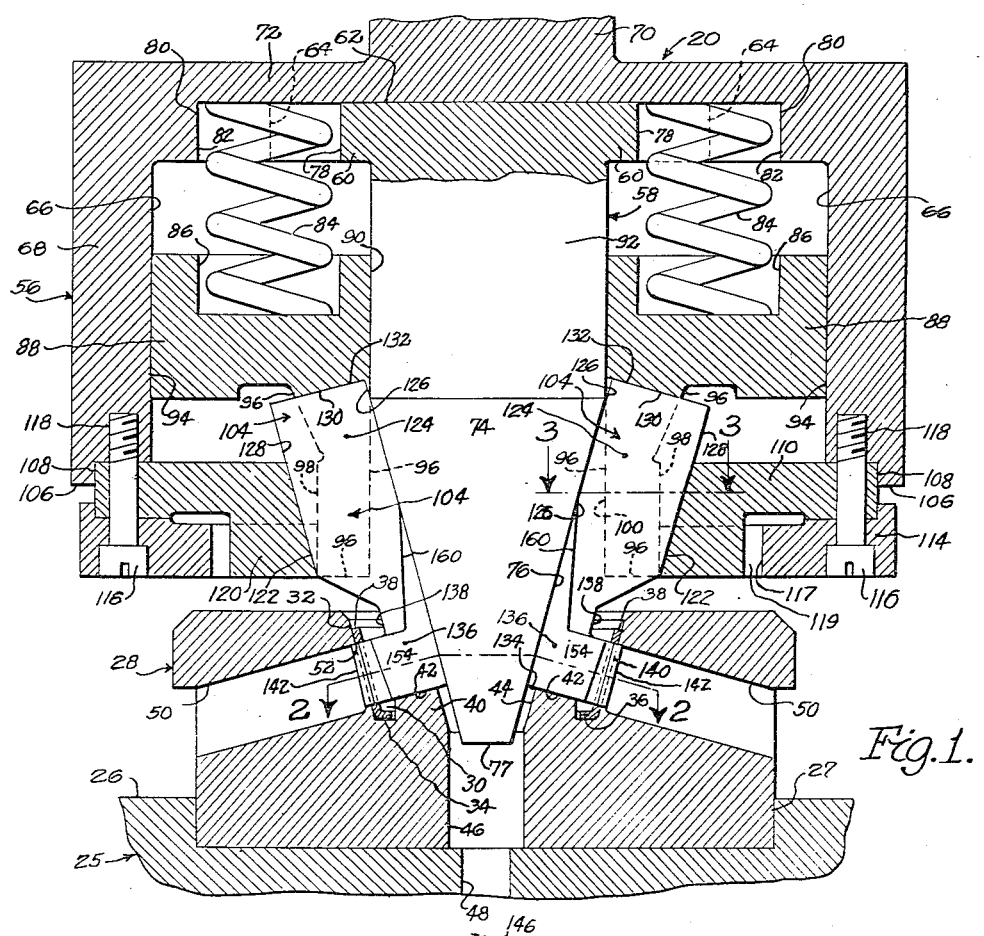
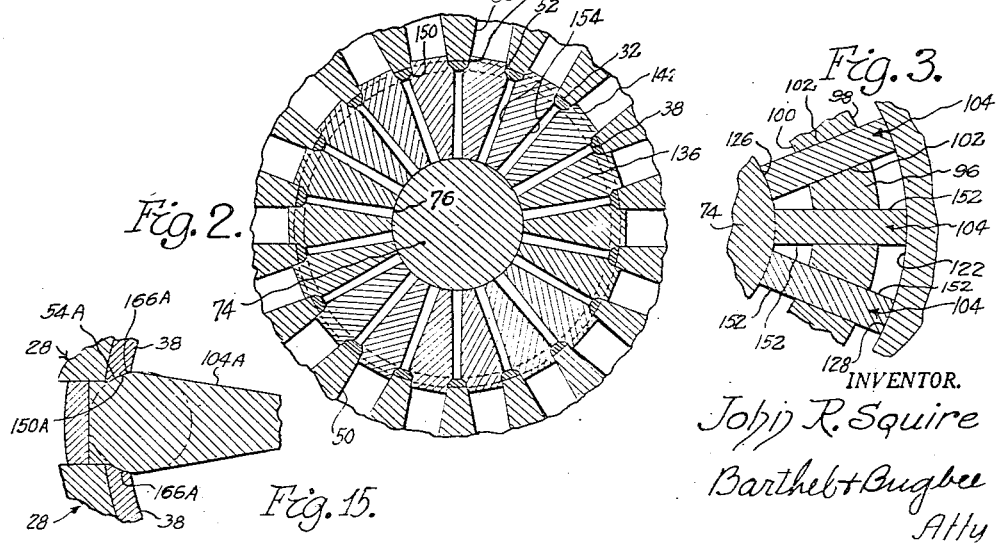
INVENTOR.
John R. Squire
Bartheb + Bugbee
Atty

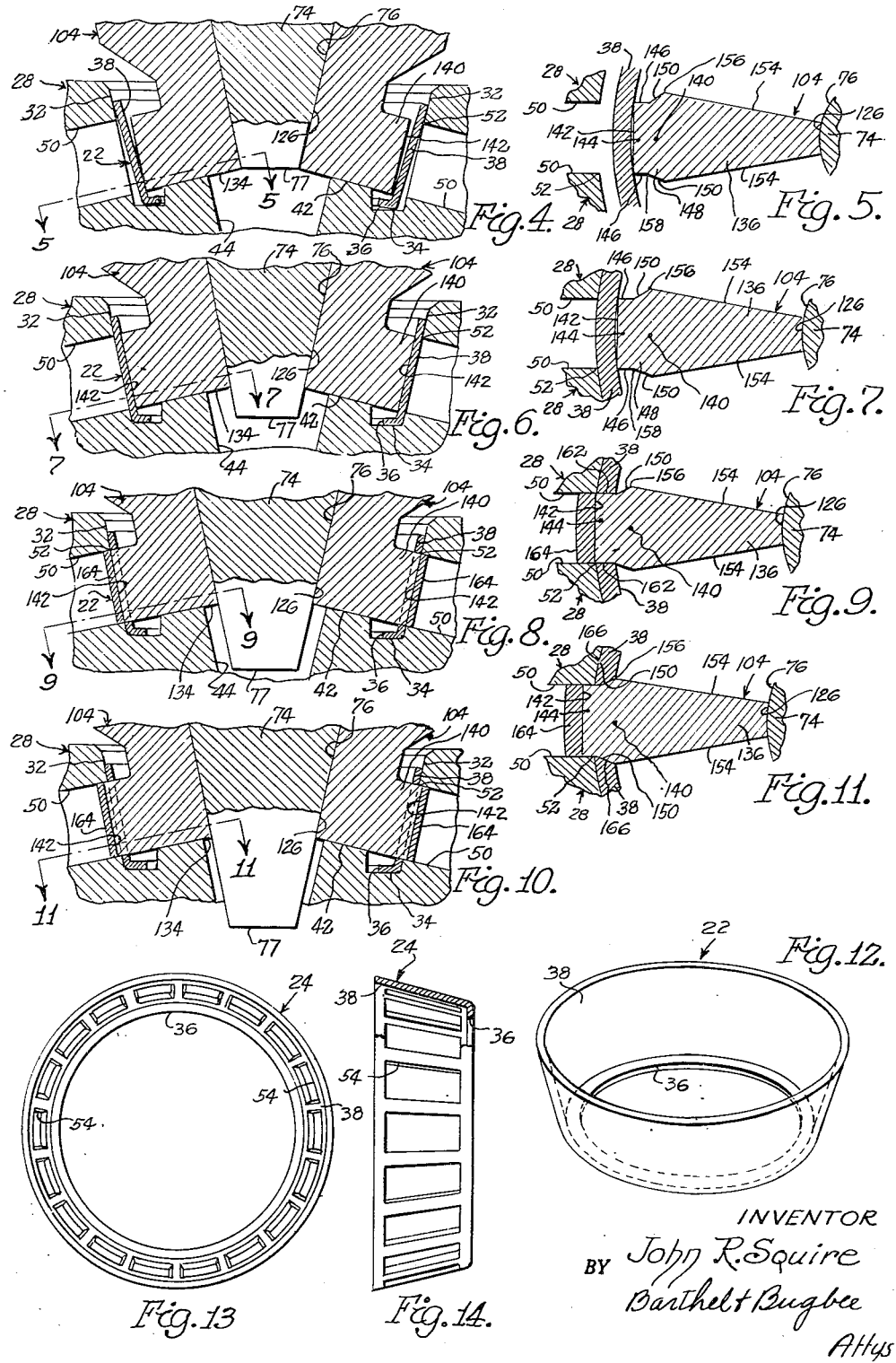

United States Patent Office 2,774,132
Patented Dec. 18, 1956

2,774,132

METHOD OF MAKING ROLLER BEARING ROLLER RETAINERS

John R. Squire, Grosse Pointe, Mich., assignor, by mesne assignments, to Federal-Mogul-Bower Bearings, Inc., Detroit, Mich., a corporation of Michigan Application August 17, 1953, Serial No. 374,488

10 Claims. (Cl. 29—148.4)

This invention relates to methods of making roller bearings and, in particular, to roller retainers for such roller bearings.

One object of this invention is to provide a method for making roller retainers for anti-friction roller bearings wherein the bottom portion of the roller retainer is expanded and apertures for the rollers punched and swaged in a single continuous operation in a single machine, thereby eliminating the separate operations and separate machines previously required in making such retainers.

Another object is to provide a method for making roller retainers for anti-friction roller bearings wherein the retainer is swaged in an angular or flared manner during the same operation set forth in the preceding object.

Other objects and advantages of the invention will become apparent during the course of the following description of the accompanying drawings, wherein:

Figure 1 is a diagrammatic central vertical section through a machine or die for expanding, punching and swaging roller retainers of anti-friction roller retainers of anti-friction roller bearings in a single continuous operation, shown at the completion of the operation;

Figure 2 is a generally horizontal but slightly inclined section taken along the line 2—2 in Figure 1;

Figure 3 is a fragmentary horizontal section taken along the line 3—3 in Figure 1;

Figure 4 is an enlarged fragmentary view of the lower central portion of Figure 1, showing the position of the parts at the commencement of the operation;

Figure 5 is a generally horizontal but slightly inclined section taken along the line 5—5 in Figure 4;

Figure 6 is an enlarged fragmentary view of the lower central portion of Figure 1, taken at the end of the retainer expanding stage of the operation;

Figure 7 is a generally horizontal but slightly inclined section taken along the line 7—7 in Figure 6;

Figure 8 is an enlarged fragmentary view of the lower central portion of Figure 1, taken at the end of the punching stage of the operation;

Figure 9 is a generally horizontal but partially inclined section taken along the line 9—9 in Figure 8;

Figure 10 is an enlarged fragmentary view of the lower central portion of Figure 1, taken at the end of the swaging stage of the operation;

Figure 11 is a generally horizontal but slightly inclined section taken along the line 11—11 in Figure 10;

Figure 12 is a perspective view of the roller retainer blank prior to the commencement of the operation;

Figure 13 is a top plan view of a roller retainer after the completion of the operation of the process of the present invention;

Figure 14 is a side elevation, partly in section, of the roller retainer shown in Figure 13; and Figure 15 is a generally horizontal but partially inclined section of a modification of the shape of a roller slot.

Roller retainers are used in anti-friction roller bearings for holding the rollers in their desired positions during assembly of the bearing and also for spacing the bearing rollers so that they will not rub against one another while the bearing is running. The retainer must be so constructed and shaped as to permit free rolling of the rollers regardless of whether the bearing is running in a horizontal or a vertical position or in any intermediate position therebetween. Accordingly, when the bearing is running in a horizontal position, the retainer must fit sufficiently closely to prevent it from dropping downward and touching the bearing cup.

The bearing roller retainer ordinarily consists of a frusto-conical shell of sheet metal which has circumferentially-spaced rectangular apertures punched at regular intervals in its conical side wall, into which apertures the anti-friction bearing rollers extend in the assembled and running positions of the bearing. While the sides of the apertures for the rollers may be left in their radially disposed condition produced as a result of the punching operation which formed the apertures, it has been found preferable to provide the opposite longitudinal edges of each aperture with either a flat or curved swage in order to more closely confine the rollers and lengthen the life of the bearing by reducing wear upon the retainer.

In view of the fact that the roller bearing cone or inner race has an annular flange at the small end thereof, the bearing cannot be assembled without temporarily expanding the bottom portion or smaller diameter portion of the retainer prior to assembly, after which the same end of the retainer is contracted or "closed in" at the conclusion of the assembling operation.

The retainer is made from a frusto-conical blank which is blanked, drawn and pierced at its small end in a die, by conventional operations. Hitherto, the roller apertures or slots were punched by placing this blank in one die. After punching, the thus perforated retainer was transferred to a second die for swaging the opposite longitudinal edges of the retainer. At the completion of swaging, the swaged retainer was then transferred to a third die wherein the smaller diameter of the retainer was expanded outwardly so as to temporarily increase its diameter for assembly purposes. The separate operations, machines and operators for performing these hitherto separate tasks, as well as the time and labor in transferring the work from one machine to another and in properly lining up the work in each machine, has added greatly to the expense of producing the retainers, as well as increasing the percentage of spoiled work and likewise increasing the number of workmen necessary in turning out a given number of bearings.

The method of the present invention eliminates these separate operations, the transfer from machine to machine, and the loss of time, expense and labor involved therein, by performing all these hitherto separate operations upon the retainer blank in a single continuous operation in a single machine by a single operator. Furthermore, since the retainer blank is not shifted or transferred during the successive stages in which the continuous operation is carried on, there is no problem of alignment or indexing of the retainer blank and consequently no losses resulting from errors in properly positioning the retainer blank, as have hitherto occurred.

In general, the present method consists in placing the frusto-conical blank in a die cavity having a frusto-conical abutment surface of the expanded configuration, i. e. which has been relieved at its lower end to permit expansion of the smaller diameter of the blank. A series of punches are arranged in a radial array, the number of punches corresponding to the number of apertures or slots required in the retainer for the bearing rollers, each of these punches having a forward portion which not only expands the smaller diameter of the blank but also punches the aperture or slot. This section of the forward portion of the punch has parallel sides, and is followed by a flared or wedge-shaped portion which performs the swaging stage of the operation as the punch is pushed farther outward immediately after the slot or aperture has been punched. This flared or wedge-shaped portion of the punch bevels the inner portions of the opposite longitudinal sides of each roller slot or aperture, either with a flat swaged surface or with a curved one, depending upon the nature of the swaged surface which it is desired to produce.

Referring to the drawings in detail, Figures 1 to 3 inclusive show a machine, generally designated 20, constituting one embodiment of apparatus for carrying out the method of the present invention, other and modified machines being possible for construction for carrying out the same operation. The machine 20 produces the expanding, slotting and swaging stages of the operation in a single continuous operation upon the flanged frusto-conical blank, generally designated 22, of Figure 12 to produce the anti-friction bearing roller retainer, generally designated 24, shown in Figures 13 and 14. The machine or die is used in a conventional press, generally designated 25, having a bed or work table 26 with a socket or recess 27 therein for receiving the work or blank holder, generally designated 28.

The blank holder 28 is in the form of a cylindrical block having a central frusto-conical die cavity 30 in the center thereof having a conical side wall 32 terminating in an annular bottom groove 34 for receiving the flange 36 at the bottom of the side wall 38 of the retainer blank 22. Inwardly of the groove 34 the block 28 is provided with an upstanding pad portion 40 (Figure 1) having a conical top surface 42 surrounding a central flared or frusto-conical hole 44 leading into a central bore 46 communicating with a coaxial central bore 48 in the bed 26. Extending radially outward from the conical side wall 32 of the die cavity 30 are multiple bores or passageways 50 having entrance openings 52 of rectangular outline corresponding to the rectangular outline of the roller slots or apertures 54 in the roller retainer 24 (Figure 14).

Cooperating with the blank holder 28 is a punch holding and operating unit, generally designated 56, forming the upper machine 20. The unit 56 has a central plunger 58 with an enlarged or flanged upper end portion 60 abutting the upper or end surface 62 of a counterbore 64 at the end of a cylindrical bore 66 in a cup-shaped housing 68 having a stem 70 disposed centrally in the upper wall 72 thereof. The lower end portions 74 of the plunger 58 is of frusto-conical shape with a conical surface 76 of the same curvature as the flared conical hole 44 and projecting downwardly therein with its lower end 77 in the bore 46. The flanged upper portion 60 of the plunger 58 is bolted or otherwise secured to the wall 72 of the housing 68, and its periphery is provided with circumferentially-spaced semi-circular notches 78 cooperating with corresponding semi-circular notches 60 extending outwardly from the counterbore 54 at spaced intervals therearound in order to provide pockets or sockets 82 for the upper ends of helical compression springs 84. The lower ends of the springs 84, of which there are preferably at least 4, are seated in corresponding pockets 86 disposed at similarly-spaced intervals around the circumference of the upper surface of a pressure ring 88 having a central bore 90 slidably engaging the cylindrical portion 92 of the plunger 58 and having an outer cylindrical surface 94 slidably engaging the bore 66.

Extending downwardly from the lower side of the pressure ring 88 at circumferentially-spaced intervals therearound are longitudinal spacing fingers 96 (Figure 3) of roughly sector-shaped cross-section with outer and inner surfaces 98 and 100 centered at the axis of the plunger 58 and with opposite side walls 102 disposed radially thereof.

These fingers 96 serve to space apart circumferentially from one another multiple processing tools, generally designated 104 which slidably engage the radial or inclined surfaces 102 of the spacing fingers 96. The rim 106 of the housing 68 is provided with an annular rabbet 108 in which is seated a tool operating ring 110 held in place by a retaining ring 114, both being drilled to receive retaining screws 116 threaded into threaded sockets or holes 118 in the rim 106 of the housing 56. The ring 114 is internally notched as at 117 at intervals around its inner periphery to provide spaced inwardly-projecting radial fingers 119, the ends of which slidably engage and serve as abutments for the outer edges of the longitudinal fingers 96. The tool operating ring 110 has a downwardly-extending central annular portion 120 which is also provided with radial notches receiving the radial fingers 119. The ring 110 is provided with an inner conical surface 122 coaxial with and of the same taper as the surface 76 of the lower end 74 of the plunger 58. In other words, a plane through the axis of the plunger 58 intersects the surfaces 76 and 122 in parallel lines (Figure 1).

The multiple processing tools 104 mounted in the spaces between the fingers 96 extend radially to the axis of the plunger 58 and are of roughly rectangular outline. Each tool 104 has an upper portion 124 with parallel inner and outer edges 126 and 128 of arcuate cross-section respectively engaging the conical surfaces 75 and 122 of the forward plunger portion 74 and tool operating ring 110. The tool 104 also has an upper edge or top 130 which engages the conical annular surface 132 on the inner part of the bottom surface of the pressure ring 88 so as to be urged downwardly thereby, causing the lower end 134 of the lower portion 136 of the tool 104 to correspondingly engage the conical top surface of the pad portion 40. The tool 104 is inwardly notched or cut away as at 138 between the upper and lower portions 124 and 136 of the tool 104 so as to provide an outwardly-extending nose portion or working portion 140.

The nose portion or working portion 140 is adapted to move into and out of its respective entrance opening 52 of its corresponding passageway 50 in performing the punching and swaging stages of the operation, the notches or cutaway portions 138 being provided to permit reciprocation of the nose portion 140 into and out of the passageway 50. Each nose portion 140 is provided with a forward end surface 142 (Figure 5) adapted to perform the retainer expanding stage of the operation, a punch portion 144 with parallel sides 146 adapted to thereafter perform the punching stage of the operation, and a swaging portion 148 having tapered sides 150 adapted subsequently to perform the swaging stage of the operation. The upper portion 124 of each tool 104 has parallel side surfaces 152 whereas the lower portion 136 thereof inwardly of the swinging portion 148 is of wedge-shaped cross-section having converging side surfaces 154 tapered oppositely to the converging side surfaces 150 of the swaging portion 148, and meeting the latter in a ridge 156. Similarly, the tapered swaging surfaces 150 and the parallel punching surfaces 146 meet one another in a line of junction 158. Furthermore, since the side surfaces 152 of the upper portion 124 of the tools 104 are parallel and the side surfaces 154 of the lower portions 136 are non-parallel, they meet one another in an inclined line of junction 160 extending from one portion into the other (Figure 1).

In practising the process of the present invention, the roller retainer blank 22 is placed in the die cavity 32 (Figure 4). In the first stage of the operation, the nose portions 140 of the tools 104 are moved outwardly in radial directions (Figures 4 and 5), causing the front end surfaces 142 to push the lower portion of the blank side wall 38 outward into engagement with the die cavity 32. Since the latter is of a smaller included angle than the included angle of the side wall 38, the side wall 38 is expanded into engagement with the die cavity 32 so that the lower or smaller diameter thereof is increased in diameter whereas the upper or larger diameter remains constant (Figure 6).

In the second stage of the operation, the nose portions 140 of the tools 104 are continued in their outward radial motion from the position of Figures 6 and 7 to the position of Figures 8 and 9, causing the punch portion 144 to pierce the side wall 38, producing the aperture 54 therein with parallel side surfaces 162 (Figure 9). A slug 164 of material the size and shape of the roller aperture or slot 54 is severed from the side wall 38 and ejected through the entrance opening 52 into the passageway 50.

In the third stage of the operation, each tool 104 is continued in its outward radial travel a further distance from the position of Figures 8 and 9 to that of Figures 10 and 11, causing the tapered surfaces 150 of the swaging portion 148 to engage the inner portions of the parallel side surfaces 162, swaging these surfaces into tapered surfaces 166 (Figure 11). At the same time, the slug 164 is pushed still further into its respective passageway 50.

After the swaging has thus been completed in the third stage of the operation, the tools 104 are retracted by moving them radially inward, withdrawing the nose portions 140 from the apertures or roller slots 54, the roller retainer 24 itself acting as a stripper for the tools 104. The withdrawal of the swaging portion 148 during the initial retracting motion of the tool 104 withdraws the inclined or tapered surfaces 150 thereof from engagement with the swaged surfaces 166 which they have produced, relieving the pressure exerted by the material of the retainer 22 upon the tools 104 and thereby facilitating the withdrawal of the latter. With the ends 142 of the lower portions 136 of the tools 104 withdrawn from the slots 54 which they have assisted in producing, the slotted and swaged roller retainer 24 may then be withdrawn from the die cavity 32 and replaced by a new blank 22, and the process repeated, as described above.

The foregoing process is carried out by the machine 20 shown by way of example, in the following manner, in order to impart the necessary motions to the tools 104. In order to insert the roller retainer blank 22 in the die cavity 32, the punch holding and operating unit 56 is retracted upward out of the way by operating the platen (not shown) of the press 25 to which the stem 70 of the housing 68 is attached. This action exposes the die cavity 32, whereupon a blank 22 is dropped therein, occupying the position shown in Figures 4 and 5. The operator then reverses the motion of the press platen, causing the punch holding and operating unit 56 to move downward, carrying with it the tools 104, the lower ends 134 of which are at approximately the same level as the lower end of the plunger 58 or at their point of closest approach thereto (Figure 4). As the punch holding and operating unit 56 continues to move downward with the press platen, the front ends 142 of the nose portions 140 of the tools 104 encounter resistance upon engaging the side wall 38 of the blank 22, whereas the tapered portion 74 of the plunger 58 and the ring 110 continue to move downward so that, in effect, their respective surfaces 76 and 122 move radially outward with respect to a given stationary level, such as the level of the section line 3—3 in Figure 1. This action causes the tools 104 to move simultaneously outward in a generally radial direction because of the inclined mounting of the tools 104. This action causes the nose portion 140 of the lower portions 136 of the tools 104 to move outward from the position of Figures 4 and 5 to that of Figures 6 and 7, expanding the lower portion of the blank 22 against the die cavity 32.

The punch holding and operating unit 56 continues to move downward with the platen of the press, causing the plunger 58 and ring 110 to continue to move the tools 104 approximately radially outward, causing the nose portions 140 of the tools 104 to move from the position of Figures 6 and 7 to the position of Figures 8 and 9, punching the apertures 54 by means of the punch portion 144. The plunger 58 and ring 110 continue to move downward along with the press platen, and continue to move the nose portions 140 outward, from the position of Figures 8 and 9 to the position of Figures 10 and 11, bringing the swaging portion 148 of each tool into operation to swage or bevel the side surfaces 152 of the roller slots 54 as at 166. During this outward motion of the tools 104, the lower ends 134 of the latter are pressed downward against the conical upper surface 42 of the pad portion 40 (Figure 1) and slide outwardly therealong while maintained in contact therewith by the coil springs 84, acting downwardly against the ring 88 while the fingers 96 maintain the tools 104 circumferentially separated from one another.

The press now reverses its motion to cause the press platen and punch holding and operating unit 56 to move upward. As the plunger 58 and ring 110 move upward with the casing 68, the tools 104 are still held in engagement with the pad surface 42 by the spring-pressed ring 88 so that they do not immediately travel upward but, instead, move radially inward as the conical surface 122 on the ring 110 moves upward against the outer edges 128 of the tools 104, pushing them approximately radially inward while the inner conical surface 76 on the lower portion 74 of the plunger 58 moves upward out of their way. The result is that the nose portions 140 of the lower portions 136 of the tools 104 move inwardly toward the axis of the plunger 58, and are withdrawn from the apertures of slots 54 which they have just formed in the blank 22.

The punch holding and operating unit continues to move upward with the press platen on its retraction stroke while the pressure ring 88 continues to hold the tools 104 in contact with the pad surface 42 until the lower surface of the pressure ring 88 engages the upper surface of the ring 110 (Figure 1). This releases the pressure of the springs 84 upon the pressure ring 88, whereupon the tools 104 are retracted upward along with the remainder of the punch holding and operating unit 56. The tools 104 can not drop out of their slots in the unit 56 because as they move down the conical portion 74 of the plunger 58, their side surfaces 154, which are tapered in a longitudinal direction as indicated by the inclination of the ridge 156 in Figure 1, come into engagement with one another.

Thus, the method of the present invention provides a continuous operation in successive stages merging smoothly into one another for expanding the roller retainer 22 at the bottom thereof, punching the slots 54 therein and swaging the longitudinal edges of those slots without requiring any moving of the blank 22 or any indexing thereof.

What I claim is:

1. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while forming multiple slots in said side wall of said shell at circumferentially-spaced locations, said slots corresponding in size and location to the size and location of the rollers in the assembled bearing, and continuing to hold the thus expanded and slotted shell in said die cavity while swaging the longitudinal edges of said slots to form approximate bevels thereon to receive said rollers.

2. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, applying outwardly-directed pressure to the side wall of said shell at circumferentially-spaced locations therearound to expand the side wall of said shell outwardly into contact with said die cavity, holding the thus expanded shell in said die cavity while forming multiple slots in said side wall of said shell at circumferentially-spaced locations, said slots corresponding in size and location to the size and location of the rollers in the assembled bearing, and continuing to hold the thus expanded and slotted shell in said die cavity while swaging the longitudinal edges of said slots to form approximate bevels thereon to receive said rollers.

3. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while substantially simultaneously forming multiple slots in said side wall of said shell at circumferentially-spaced locations, said slots corresponding in size and location to the size and location of the rollers in the assembled bearing, and continuing to hold the thus expanded and slotted shell in said die cavity while swaging the longitudinal edges of said slots to form approximate bevels thereon to receive said rollers.

4. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while forming multiple slots in said side wall of said shell at circumferentially-spaced locations, said slots corresponding in size and location to the size and location of the rollers in the assembled bearing, and continuing to hold the thus expanded and slotted shell in said die cavity while substantially simultaneously swaging the longitudinal edges of said slots to form approximate bevels thereon to receive said rollers.

5. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while substantially simultaneously forming multiple slots in said side wall of said shell at circumferentially-spaced locations, said slots corresponding in size and location to the size and location of the rollers in the assembled bearing, and continuing to hold the thus expanded and slotted shell in said die cavity while substantially simultaneously swaging the longitudinal edges of said slots to form approximate bevels thereon to receive said rollers.

6. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while continuing to apply outwardly-directed force to the areas in said shell corresponding to the desired locations of the slots sufficient to rupture the side wall of said shell and force the material thereof at said locations outwardly into said apertures in said side wall of said shell at said circumferentially-spaced locations, said slots corresponding in size and location to the size and location of the rollers in the assembled bearing, and continuing to hold the thus expanded and slotted shell in said die cavity while swaging the longitudinal edges of said slots to form approximate bevels thereon to receive said rollers.

7. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while forming multiple slots in said side wall of said shell at circumferentially-spaced locations, said slots corresponding in size and location to the size and location of the rollers in the assembled bearing, and continuing to hold the thus expanded and slotted shell in said die cavity while simultaneously applying a swaging force obliquely to the radius drawn to the longitudinal edges of said slots to form approximate bevels thereon to receive said rollers.

8. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while continuing to apply outwardly-directed force to the areas in said shell corresponding to the desired locations of the slots sufficient to rupture the side wall of said shell and force the material thereof at said locations outwardly into said apertures in said side wall of said shell at said circumferentially-spaced locations, said slots corresponding in size and location to the size and location of the rollers in the assembled bearing, and continuing to hold the thus expanded and slotted shell in said die cavity while simultaneously applying a swaging force obliquely to the radius drawn to the longitudinal edges of said slots to form approximate bevels thereon to receive said rollers.

9. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while substantially simultaneously forming multiple slots in said side wall of said shell at circumferentially-spaced locations, said slots corresponding in size and location to the size and location of the rollers in the assembled bearing, and continuing to hold the thus expanded and slotted shell in said die cavity while substantially simultaneously applying a swaging force obliquely to the radius drawn to the longitudinal edges of said slots to form approximate bevels thereon to receive said rollers.

10. A method of expanding, slotting and swaging a roller bearing roller retainer in a single substantially continuous operation, said method comprising forming an open-centered frusto-conical shell corresponding in size and shape substantially to the size and shape of the completed retainer, placing said shell in a die having a cavity with a size and shape corresponding to the size and shape desired for the expanded shell and with apertures therein corresponding in size and shape to the slots desired in said retainer, forcibly expanding the side wall of said shell outwardly into contact with said die cavity, holding the thus expanded shell in said die cavity while forming multiple slots in said side wall of said shell at circumferentially-spaced locations, said slots corresponding in size and location to the size and location of the rollers in the assembled bearing, and continuing to hold the thus expanded and slotted shell in said die cavity while concavely swaging the longitudinal edges of said slots to form approximately concave bevels thereon to receive said rollers.

References Cited in the file of this patent
UNITED STATES PATENTS

| | | |
|---|---|---|
| 1,510,718 | Strong | Oct. 7, 1924 |
| 1,766,214 | Booth | June 24, 1930 |
| 1,766,217 | Booth | June 24, 1930 |
| 1,920,303 | Grotnes | Aug. 1, 1933 |